(12) United States Patent
Bullman (10) Patent No.: US 7,313,711 B2
(45) Date of Patent: Dec. 25, 2007

(54) ADAPTIVE POWER MANAGEMENT IN PORTABLE ENTERTAINMENT DEVICE

(75) Inventor: William R. Bullman, Macungie, PA (US)

(73) Assignee: Agere Systems Inc., Allentown, PA (US)

( * ) Notice: Subject to any disclaimer, the term of this patent is extended or adjusted under 35 U.S.C. 154(b) by 282 days.

(21) Appl. No.: 11/002,656

(22) Filed: Dec. 3, 2004

(65) Prior Publication Data
US 2006/0123262 A1 Jun. 8, 2006

(51) Int. Cl.
*G06F 1/00* (2006.01)
*G06F 1/26* (2006.01)
*G06F 1/32* (2006.01)

(52) U.S. Cl. .................. 713/322; 713/300; 713/320

(58) Field of Classification Search ............ 713/322, 713/323, 300, 320
See application file for complete search history.

(56) References Cited

U.S. PATENT DOCUMENTS

| | | | |
|---|---|---|---|
| 5,996,084 A * | 11/1999 | Watts | 713/323 |
| 6,441,857 B1 * | 8/2002 | Wicker et al. | 348/441 |
| 6,721,892 B1 * | 4/2004 | Osborn et al. | 713/300 |
| 2005/0265486 A1 * | 12/2005 | Crawley | 375/326 |
| 2006/0047987 A1 * | 3/2006 | Prabhakaran et al. | 713/322 |

OTHER PUBLICATIONS

Chang, Hoseok, Optimization of Power Consumption for an ARM7-Based Multimedia Handheld Device, May 25, 2003.*

* cited by examiner

*Primary Examiner*—Chun Cao
*Assistant Examiner*—Ji H Bae (57) ABSTRACT

Battery life in portable entertainment devices that play fixed-length music or video files (e.g., MP3 music files) is extended by adaptively adjusting the speed of a processor in the device such that only a minimum number of MIPS are performed to playback the music or video files. Slowing the processor clock provides significant savings in power usage. A use profile containing required MIPS for each song may be stored on the device, or use profile information may be inserted into the data stream or embedded within the data file. Power savings occurs on every subsequent replay of the same entertainment data file or data stream by adaptively adjusting the processor clock to the desired speed as determined by the use profile information (plus design margin based on the particular playback device).

16 Claims, 8 Drawing Sheets

| TRACK | REQUIRED CLOCK CYCLES | LENGTH | ... |
|---|---|---|---|
| ELVIS PRESLEY BLUE SUEDE SHOES | 16217291725 | 402 | ... |
| ... | ... | ... | ... |

Use profile information spans REQUIRED CLOCK CYCLES and LENGTH columns.

202 points to the ELVIS PRESLEY BLUE SUEDE SHOES row.

PROFILE FILE

| TIMESTAMP | LOCKRATE |
|---|---|
| 0:00:00.000 | 65.00 |
| 0:00:00.025 | 75.25 |
| 0:00:00.050 | 50.75 |
| 0:00:00.090 | 65.00 |
| 0:00:01.050 | 55.33 |
| 0:00:01.750 | 68.40 |
| 0:00:02.250 | 65.00 |
| 0:00:02.650 | 54.12 |
| 0:00:03.050 | 61.00 |
| 0:00:03.250 | 67.34 |
| 0:00:03.330 | 52.78 |
| 0:00:03.500 | 58.56 |
| — | |

MIPS PROFILE FILE

| TIMESTAMP | MP3 DATA |
|---|---|
| 0:00:00.000 | MP3 DATA 1 |
| 0:00:00.025 | MP3 DATA 2 |
| 0:00:00.050 | MP3 DATA 3 |
| 0:00:00.090 | MP3 DATA 4 |
| 0:00:01.050 | MP3 DATA 5 |
| 0:00:01.750 | MP3 DATA 6 |
| 0:00:02.250 | MP3 DATA 7 |
| 0:00:02.650 | MP3 DATA 8 |
| 0:00:03.050 | MP3 DATA 9 |
| 0:00:03.250 | MP3 DATA 10 |
| 0:00:03.330 | MP3 DATA 11 |
| 0:00:03.500 | MP3 DATA 12 |
| — | — |

MP3 DATA FILE

*FIG. 6*

| FRAME 1 | CLOCK RATE 1 | MP3 DATA 1 | FRAME 2 | CLOCK RATE 2 | MP3 DATA 2 | FRAME 3 | CLOCK RATE 3 | MP3 DATA 3 | FRAME 4 | CLOCK RATE 4 | MP3 DATA 4 | ... |

MP3 FILE WITH EMBEDED CLOCK DATA

ADAPTIVE POWER MANAGEMENT IN PORTABLE ENTERTAINMENT DEVICE

BACKGROUND OF THE INVENTION

1. Field of the Invention

This invention relates to portable entertainment devices. In particular, it relates to power management techniques in portable entertainment devices such as MP3 players, video players, portable jukeboxes, etc.

2. Background of Related Art

The world has been transformed by the emergence of portable entertainment devices, especially by the explosion of players of compressed music files, in particular those files compressed using the ever-popular MPEG3 ("MP3") encoding for music, compressed video files, etc.

Figure 8:
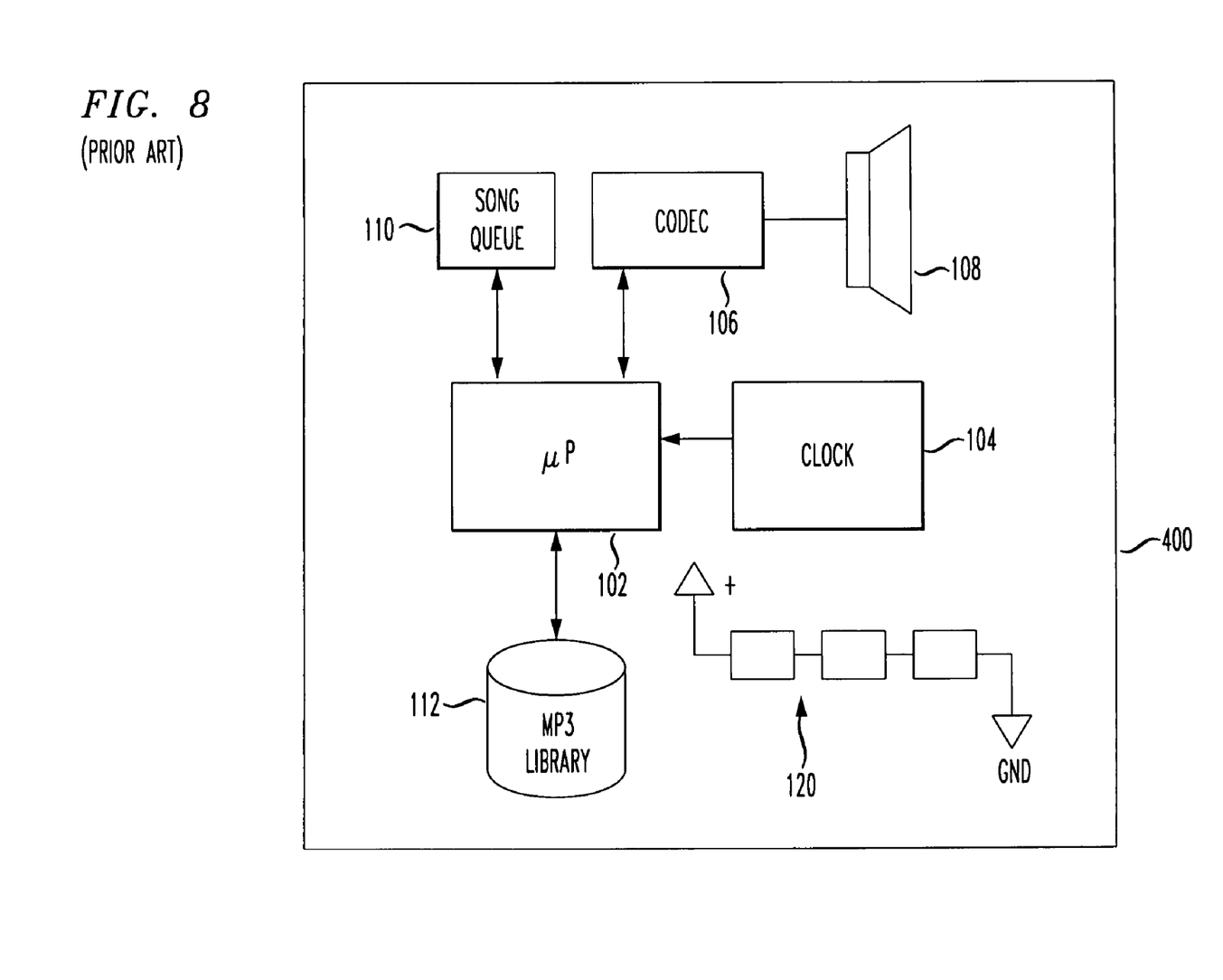
FIG. 8 shows a conventional MP3 player.

FIG. 8 shows a conventional MP3 player.

In particular, as shown in FIG. 8, an MP3 player 400 includes a processor 102, a clock 104 such as a crystal or oscillator, used to set the processor MIPS speed, a CODEC 106 and output speaker 108. Entertainment data 112 is stored in the MP3 device 400, e.g., in non-volatile memory, on a removable media card or removable memory card, floppy disk, internal or external hard drive, etc. Batteries 120 installed in the MP3 player 400 allow portable use of the MP3 player 400. A user operates various buttons (not shown) on the MP3 player 400 to instruct it to queue up certain songs or other entertainment data files, placing either a list of songs to be played, or copies of the song files themselves, in a song queue 110.

Conventional portable entertainment devices utilize a processor clock 104 having a fixed speed. Generally, designers of conventional portable entertainment devices choose the fixed clock speed based on maximum needs or peak demands.

Thus, conventional designers of portable entertainment devices choose a processor clock having a speed which addresses the needs (usually measured in Million Instructions Per Second (MIPS)) of a software algorithm.

However, the present inventor appreciates that this will result in the clock running faster than required during playback of many files. Over long periods of time, this excessive speed results in wasted power.

There is a need for solutions to the short battery life in portable media players such as MP3 players.

SUMMARY OF THE INVENTION

In accordance with the principles of the present invention, an entertainment device capable of playing digital data includes a power savings module. The power savings module includes a variable speed clock, and a clock speed profile determiner module to adaptively set a speed of the variable speed clock based on a MIPS requirement of digital data being played by the entertainment device.

A method for saving power usage in an entertainment device in accordance with another aspect of the present invention comprises determining an approximate minimum required MIPS for playback of digital data. A speed of a processor clock is adjusted in the entertainment device based on the determined approximate minimum required MIPS for playback of the digital data.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention extends battery life in portable entertainment devices that play fixed-length music or video files (e.g., MP3 music files).

In a portable entertainment system that plays back pre-stored or pre-recorded entertainment data, be it music, video, etc., the content is normally played back numerous times. According to the invention, when content is used or played back, a central processing unit (CPU) or digital signal processor (DSP) use profile is generated by either hardware or software means. The use profile (e.g., required MIPS) is then associated with the relevant data file, stream, etc.

The use profile (e.g., required MIPS) can be associated in a separate data file that tabulates similar use requirements for other entertainment data files on the portable entertainment system. Alternatively, the use profile information can be inserted into the data stream or entertainment data file itself. In any case, according to the present invention, a use profile is recorded and stored on a media file, movie, song, etc. basis.

Creation of and storage of use profile information such as required MIPS to complete play of the entertainment data in the required real time does not in and of itself save any battery power. Rather, the power savings occurs on every subsequent replay of the same entertainment data file or data stream by adaptively adjusting the processor clock to the desired speed as determined by the use profile information (plus design margin based on the particular playback device).

The margin may be associated not with the particular entertainment data file or stream being played, but rather with the particular portable entertainment device that is playing back the music. For example, some entertainment devices will have electronic components that will be more susceptible to temperature variations, or may have excessively more manual functions and other processes being handled by the same processor. In such case, added MIP margin may need to be significantly larger in such devices, as compared to portable entertainment devices that have very few manual functions.

The present invention is most suitable to dedicated entertainment devices having playback of a single data file or data stream as its dedicated sole task.

Alternatively, when the entertainment data is recorded (e.g., when an MP3 file is encoded or 'ripped'), the clock rate profile or MIPS cycle needs (required MIPS) can be determined and embedded in the header or other suitable location within the encoded file, thereby allowing for power savings even on a first playback of a song by a given portable entertainment device. Data could alternatively be stored on remote disk, e.g., a network disk or server.

Figure 1:
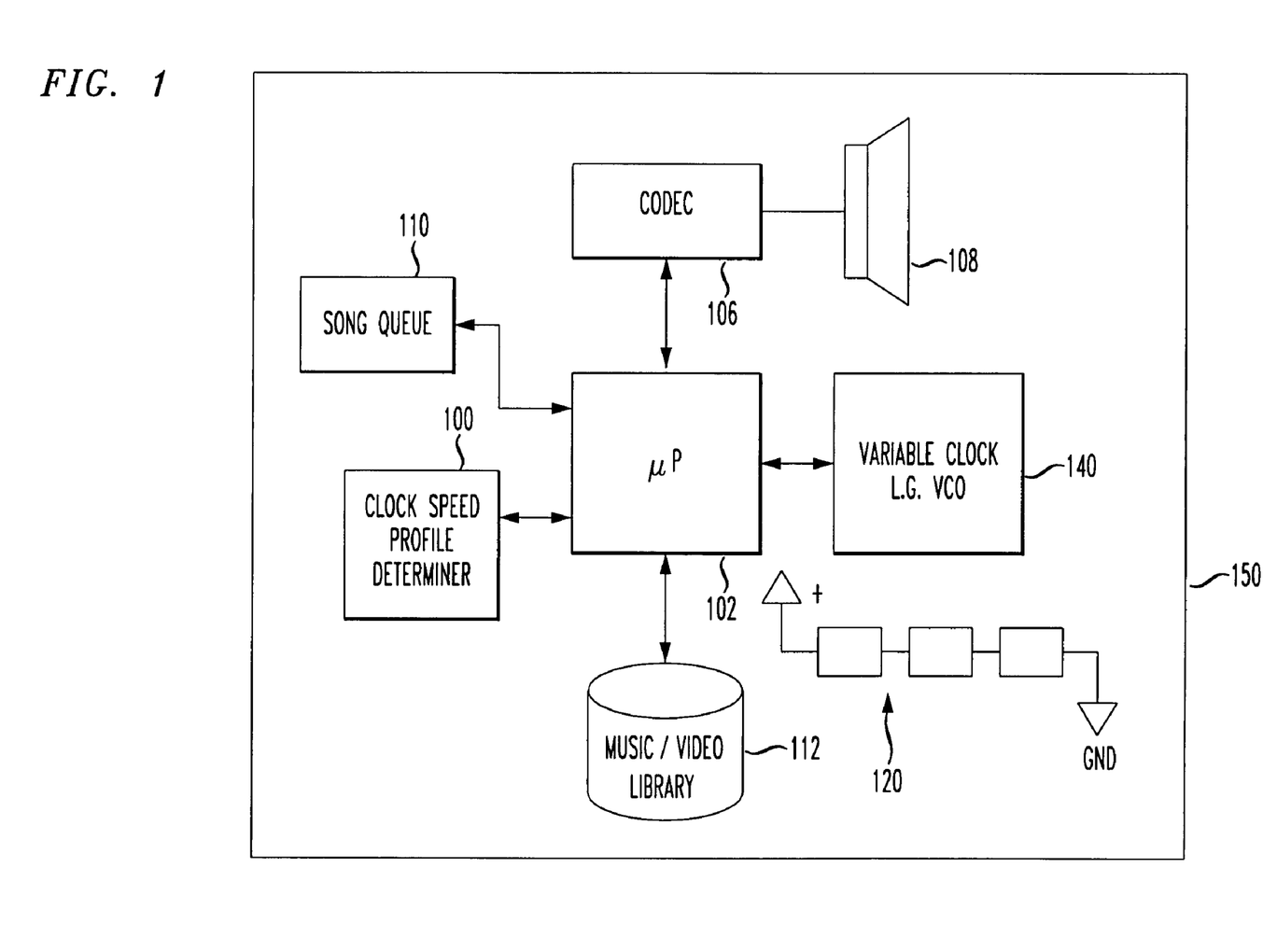
FIG. 1 shows a portable entertainment device including a variable speed processor clock, and clock speed profile determiner, in accordance with the principles of the present invention.

FIG. 1 shows a portable entertainment device including a variable speed processor clock, and clock speed profile determiner, in accordance with the principles of the present invention.

In particular, as shown in FIG. 1, a portable entertainment device 150 such as an MP3 player includes a processor 102. The processor 102 may be a microprocessor 102, digital signal processor (DSP), or other suitable control device.

The processor 102 accesses stored entertainment data files in a suitable data storage device 112. The data storage device may be fixed or portable. Exemplary fixed devices include a hard drive. Exemplary portable devices include a removable media card, removable memory card, floppy disk, DVD, etc. Exemplary data files may be, e.g., DVD files, MP3 music files, etc.

The processor 102 controls selection and play of entertainment media on the portable entertainment device, placing songs to be played in an entertainment data file queue 110. The song queue 110 may contain a full copy of each of the entertainment data files to be played, or may merely contain pointers to the location within the data storage device 112 for the processor to retrieve the entertainment data file when required for playback.

The data files are played back through suitable hardware components such as a speaker and/or display. In the given example of an MP3 player 150, music is decoded in an COder/DECoder (codec) 106, and output through a suitable amplifier and speaker 108.

Batteries 120 enable the portable entertainment device 150 to be portable. To maximize usage time between required battery recharges, the present invention minimizes MIPS performed based on the needs of the particular data files being played, preferably on a file-by-file basis.

Importantly, in accordance with the principles of the present invention, the portable entertainment device 150 includes a clock speed profile determiner module 100. In the given example, the clock speed profile determiner module 100 is located within the operating software code controlling the processor 102, e.g., in Read Only Memory (ROM) or other non-volatile memory (e.g., Electrically Erasable Read Only Memory EEROM, Flash memory, etc.)

The variable clock 140 may be, e.g., a digitally controlled clock divider or digitally controlled phase locked loop (PLL) having a desired tolerance as required by the processor and other control devices.

Figure 2:
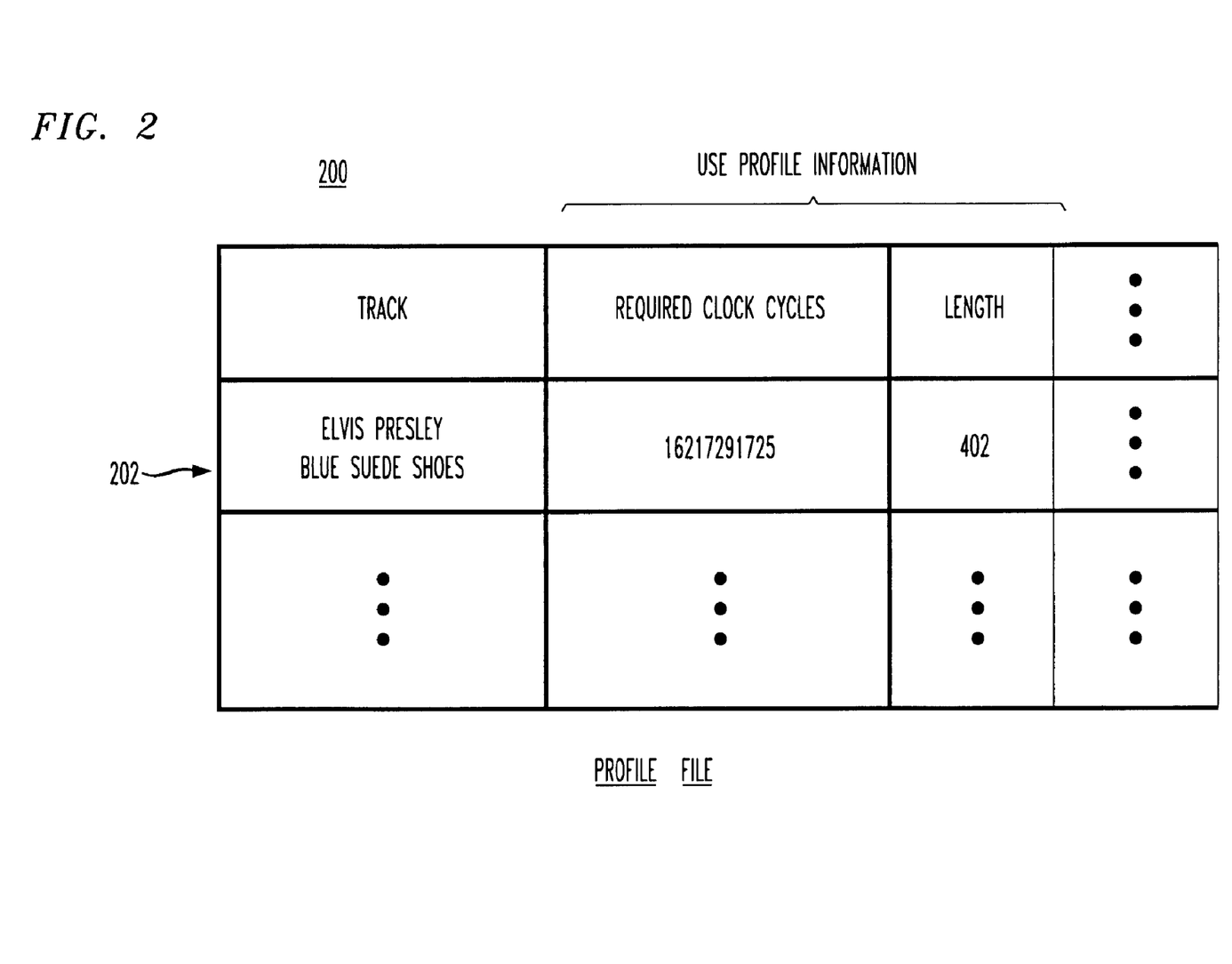
FIG. 2 shows an exemplary profile file, in accordance with the principles of the present invention.
Figure 3:
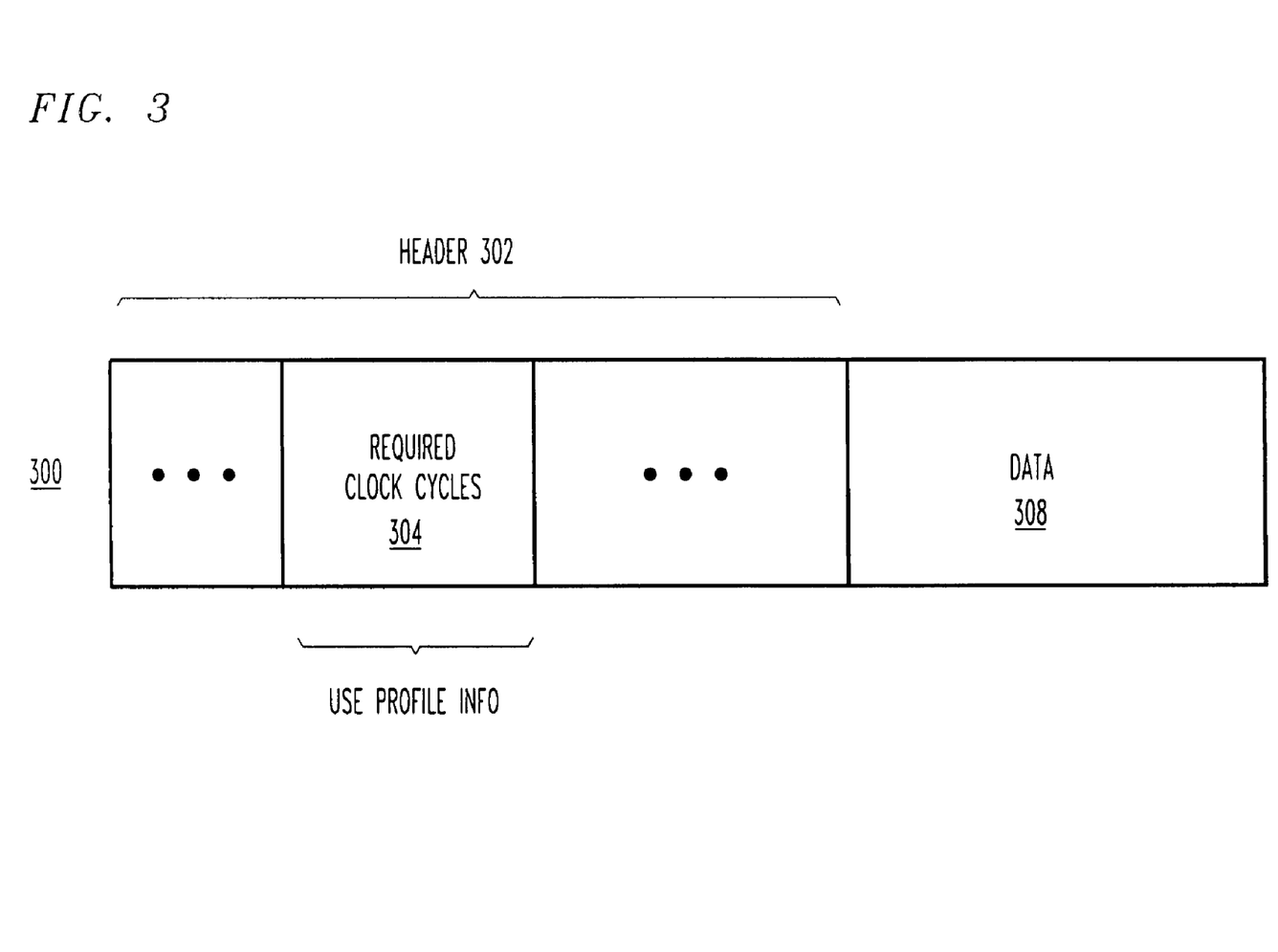
FIG. 3 shows embedded clock profile information embedded in a compressed (or uncompressed) data file, or in the headers of a data stream, in accordance with the principles of the present invention.

The clock speed profile determiner 100 profiles and sets the clock speed of a variable speed processor clock to a maximum rate, plus margin, to minimize battery usage. The clock speed profile determiner 100 determines whether use profile information (e.g., required MIPS) is available, either in a profile file stored in the memory of the portable entertainment device (FIG. 2), or embedded within the compressed data file itself (FIG. 3). If use information (e.g., required MIPS) is not available, the clock speed profile determiner 100 preferably sets the variable clock 140 to the normal (i.e., otherwise conventional) speed, allows play of the the desired entertainment track at that high speed, and monitors the number of clock cycles required to complete the task.

Such monitoring may include counting a total number of clock cycles spent in actual functional operation of playback, and not counting processor clock cycles spent in delay loops or standby modes while the real time playback of the entertainment track catches up with the processor.

Thus, rather than selecting a fixed clock speed based on MIPS requirements of operating software, as is done conventionally, the present invention adaptively sets a speed of the processor clock based on MIPS needs of each datastream as it is played.

The present inventor appreciated that power usage increases rapidly with faster speed operations. The present invention seeks to set the speed of the processor to a minimum amount necessary to accomplish the necessary task, plus margin, to presumably thus utilizing a minimum amount of power.

The margin is preferably sufficient to comfortably allow proper operation of the portable entertainment device through variable environmental conditions. For instance, as temperatures rise, the speed of electronic devices generally slows. The margin preferably accommodates a maximum operating temperature range of the portable entertainment device.

The margin also preferably allows sufficient extra processor cycles to process a reasonable amount of manual control processing, e.g., detecting and acting on button presses. Alternatively, manual button operations can be locked out during play of any particular file.

The margin may also be used to accommodate operations using a battery supply at or near it's lowest levels (i.e., almost fully discharged).

The built-in margin may be based on a percentage of the total cycles required to play a particular file in its proper length of time. For instance, a 10% margin may be predetermined as being sufficient to accommodate all margin-related variations to the clock cycles (e.g., full temperature range of operation, low battery, many manual instructions during play, etc.) FIG. 2 shows an exemplary profile file, in accordance with the principles of the present invention.

In particular, as shown in FIG. 2, each portable entertainment device 150 may include a profile file relevant to only that portable entertainment device 150. For instance, as shown in FIG. 2, the clock speed profile determiner 100 of the portable entertainment device 150 will have monitored playback of a compressed music file entitled "ELVIS PRESLY-BLUE SUEDE SHOES", and determined that it required 16217291725 clock cycles to complete, with a playback length of 4:02. (MIPS can be calculated directly from the required number of clock cycles per second of playback). This information is stored in entry 202 in the profile file 200 for the portable entertainment device 150

FIG. 3 shows embedded clock profile information embedded in a compressed (or uncompressed) data file, or in the headers of a data stream, in accordance with the principles of the present invention.

In particular, as shown in FIG. 3, a data file 300 (or packet of a data stream) includes a header portion 302. The header 302 includes otherwise conventional information, e.g., information relating to a type of compression or encoding, a data length of the data stream, a real time playback length, etc. However, in accordance with the principles of the present invention, the header 302 additionally includes use profile information relating to the data, e.g., required clock cycles 304.

Figure 4:
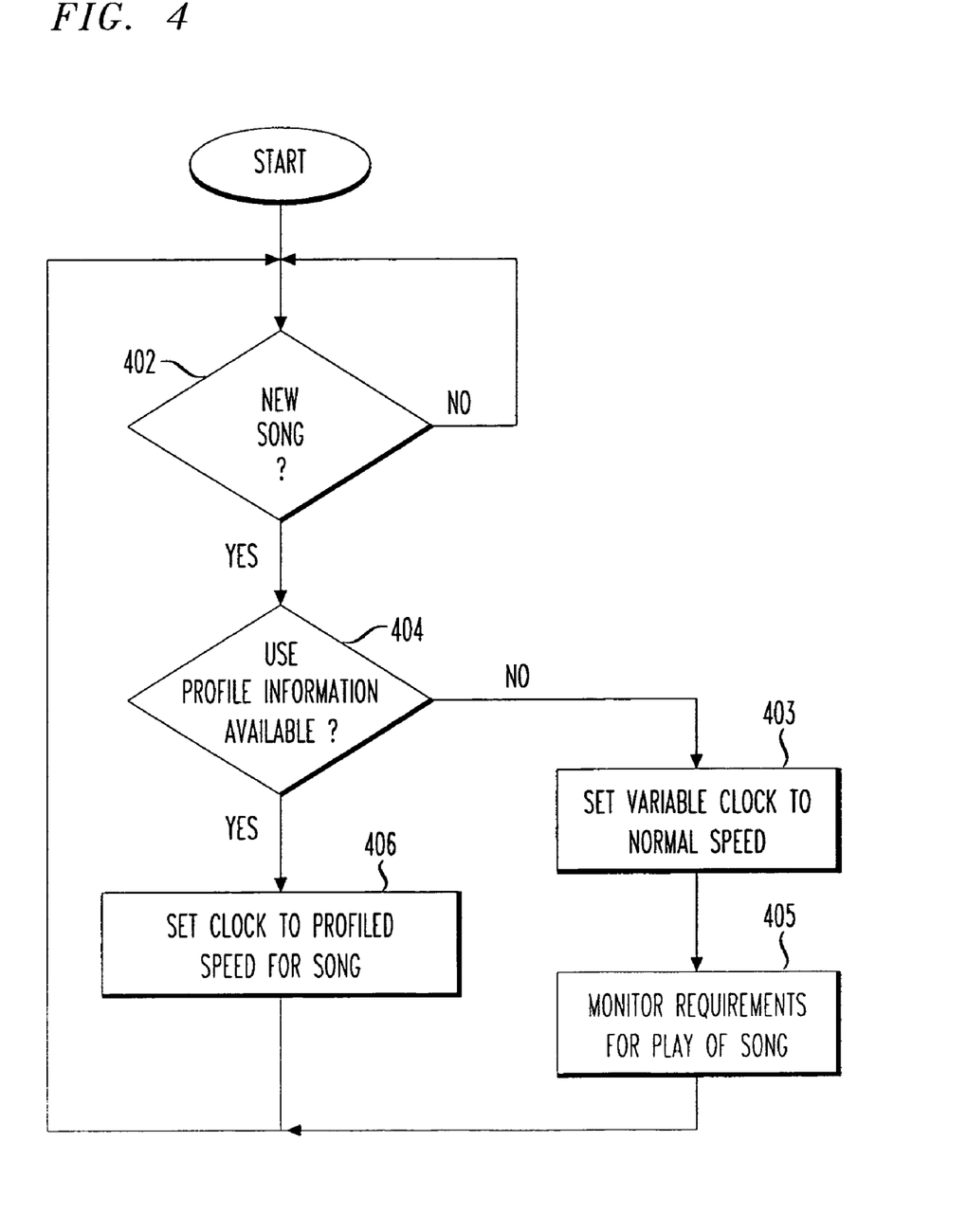
FIG. 4 shows a flow chart of a process of determining profile information for a particular song or queue of songs, and adaptively adjusting the processor clock to minimize power usage based on the determined profile information, in accordance with the principles of the present invention.

FIG. 4 shows a flow chart of a process of determining profile information for a particular song or queue of songs, and adaptively adjusting the processor clock to minimize power usage based on the determined profile information, in accordance with the principles of the present invention.

In particular, as shown in FIG. 4, the clock speed profile determiner 100, upon direction to play a song, determines if the start of a song is being requested (step 402). If not, the process loops back to step 402 to search for the start of a new song.

In step 404, if a new song was instructed, the clock speed profile determiner 100 determines whether or not use profile information is available to enable adaptive setting of the variable clock 140. Possible sources of available use profile information include a search of a profile file 200 such as the one shown in FIG. 2, a search of the header of a data stream such as is shown in FIG. 3, etc.

If use profile information is not available, the clock speed profile determiner 100 proceeds to set the variable clock to normal speed, shown in step 403, and allows playback of the song with the processor 102 operating at normal (i.e., otherwise conventional) speed. However, also in accordance with the principles of the present invention, the clock speed profile determiner 100 moves to step 405, where it monitors user profile requirements for play of the song, real time playback length of the song, etc.

If, on the other hand, use profile information is already available as determined in step 404, the variable clock 140 is preferably set to a speed sufficient to allow enough MIPS from the processor 102 to allow playback of the song, together with a desired amount of margin (e.g., 10% higher clock speed, or 10% more MIPS, etc.)

The clock speed adjustment process shown in FIG. 4 preferably repeats for each entertainment data file being played, e.g., each song, each scene in a DVD, etc. Note that in step 406, the clock speed is set on a song-by-song, or more generally speaking on a file-by-file basis. However, in an alternative embodiment, the clock speed may be set based on the needs of a plurality of songs, videos, etc. in the song queue 110 taken together as if they were one. However, power savings will be maximized by adaptively adjusting the processor clock on a song-by-song or individual entertainment data file-by-file basis.

Figure 5:
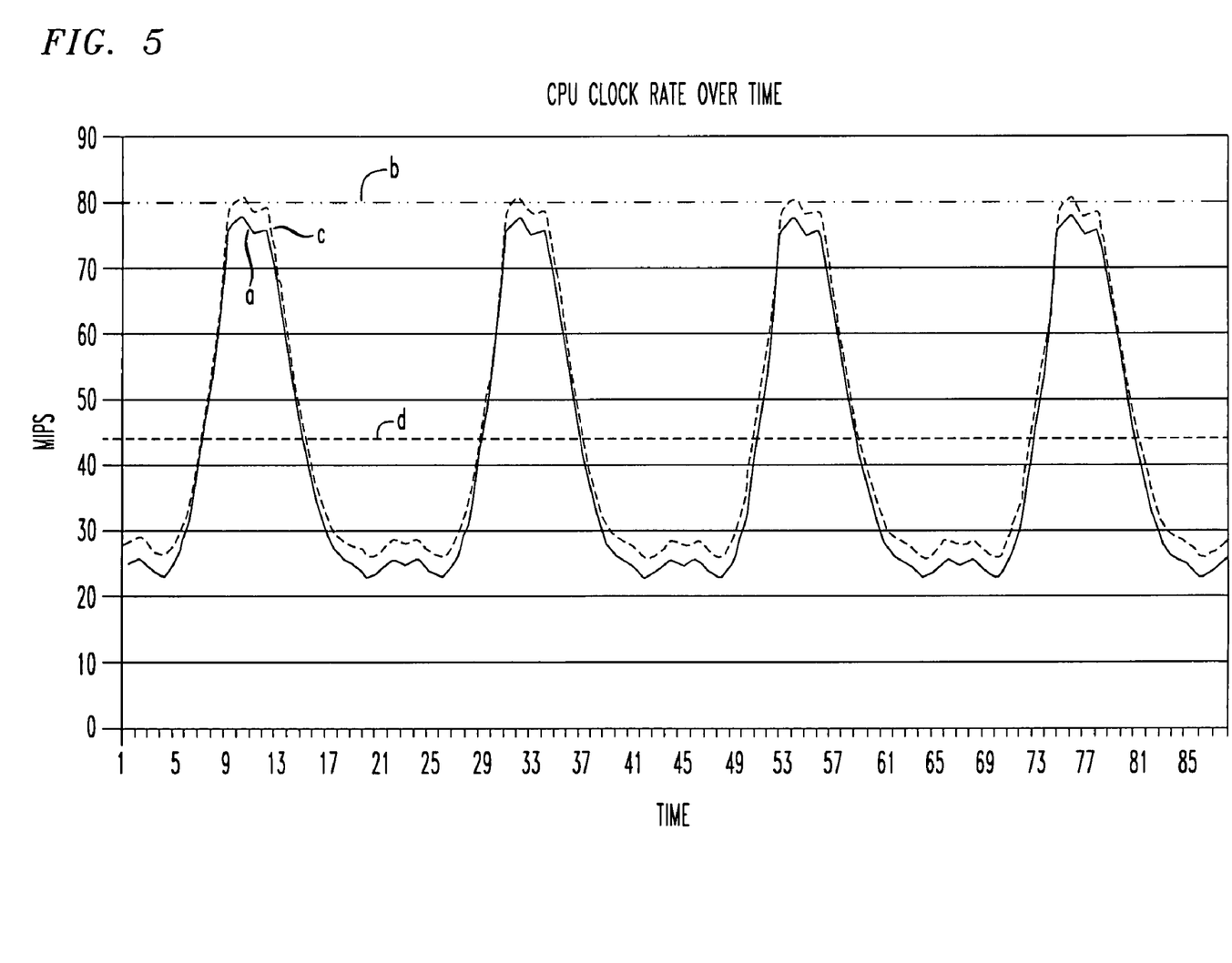
FIG. 5 compares and contrasts the processor clock settings both for a conventional device and in accordance with the principles of the present invention, clearly demonstrating a savings in MIPS expenditure, and associated power savings.

FIG. 5 compares and contrasts the processor clock settings both for a conventional device and in accordance with the principles of the present invention, clearly demonstrating a savings in MIPS expenditure, and associated power savings.

In particular, plot a in FIG. 5 shows a real time requirement for playing a given series of entertainment data files. Plot b shows a conventional clock setting of, e.g., 80 MHz. Plot c shows the adaptive settings of the variable clock in accordance with the principles of the present invention. Plot d shows the level of the average setting of the variable clock, in the given example being 44 MHz.

In comparing plot a with plot d in FIG. 5, a MIPS savings of almost 50% is realized, translating into a battery life that is significantly extended because of the lower power needs of slower operations as compared to higher speed operations.

An important feature of the present invention is the ability to dynamically adjust MIPS during playback. The way this would work is captured in two exemplary cases.

Figure 6:
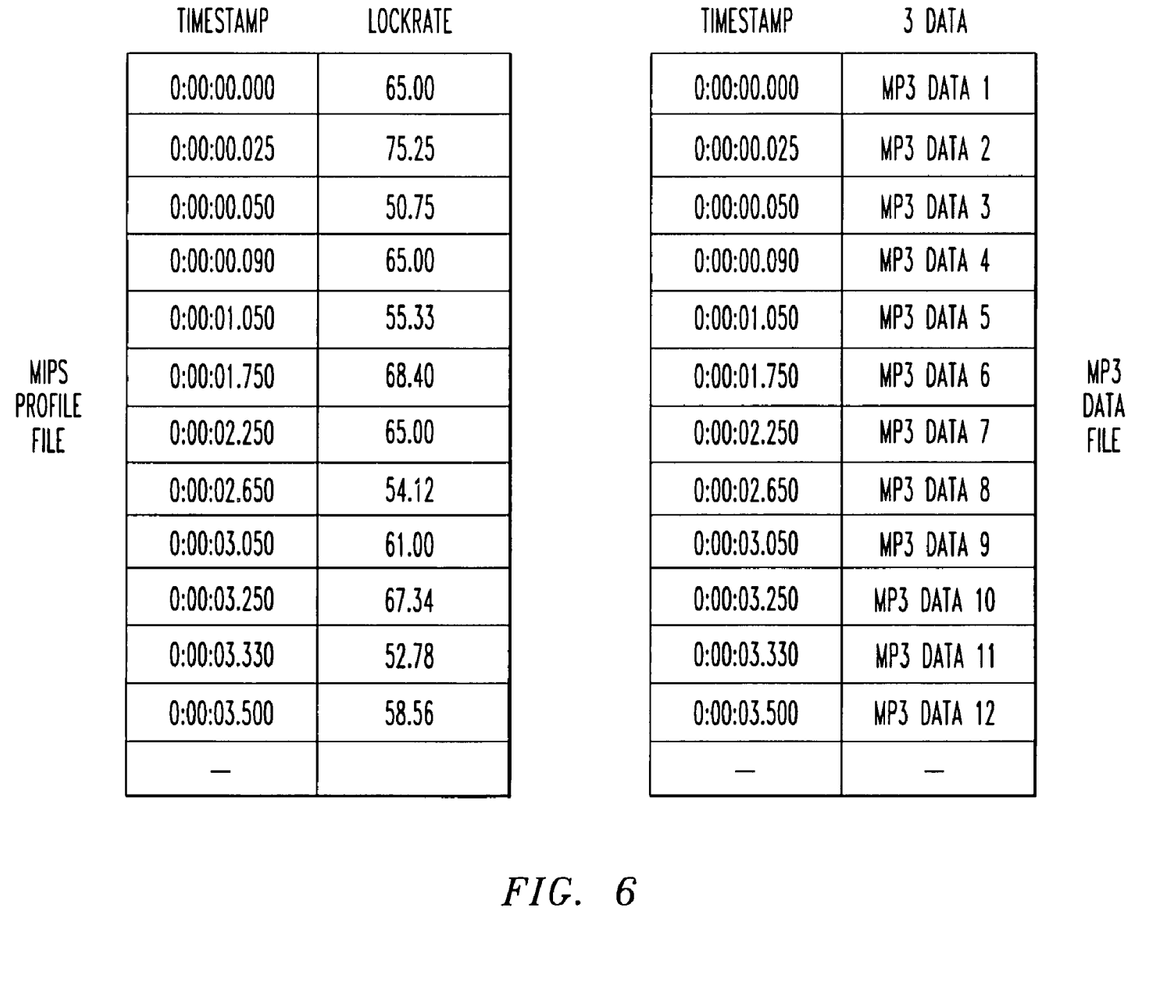
FIG. 6 shows the 2 separate file concept where either by pre-recording (for a known device) or captured on first time playback, a MIPS profile file is associated with a specific media stream, in this case a MP3 file is used although any media can be supported. In order to playback, the CPU opens both files and uses the time stamp to correlate the needed clock rate for the upcoming MP3 data and sets the clock rate for the MP3 block just before it is needed.

Case 1. Separate MIPS profile file, as shown in FIG. 6. This is a separate file, either prerecorded or created on first playback, as noted earlier. This separate file preferably includes timestamps and corresponding MIPS requirements needed for the next small period of time. As the player reads the media stream, it also reads the corresponding "MIPS" profile, and adjusts the clock dynamically, just ahead of the actual real demand, thus always staying one step ahead.

In particular, FIG. 6 shows the exemplary embodiment of two separate files where either by pre-recording(for a known device) or captured on first time playback, a MIPS profile file is associated with a specific media stream. In this case, an MP3 file is used although any media can be supported. In order to playback, the CPU opens both files and uses the time stamp to correlate the needed clock rate for the upcoming MP3 data and sets the clock rate for the MP3 block just before it is needed.

Case 2. Some media streams allow embedded vendor specific fields, or could be defined to include a dedicated field to control the real time MIPS requirements. In such applications, the player, as it reads the data stream, also adjusts the MIPS ahead of time, just staying ahead of the curve.

One way of visualizing this is to use the analogy of a terrain following aircraft. In this case the plane is the playback CPU(or DSP), the plane's altitude above the ground is the CPU current clock rate, and the terrain is the demand. The plane(CPU) constantly adjusts its altitude (clock) to always fly a predetermined altitude(MIPS) above the ground(actual MIPS needed). This way the plane flys along and never hits the ground because it knows the "flight path" because it has either flown it before and stored it away or it was pre-programmed, as shown in FIG. 5.

Figure 7:
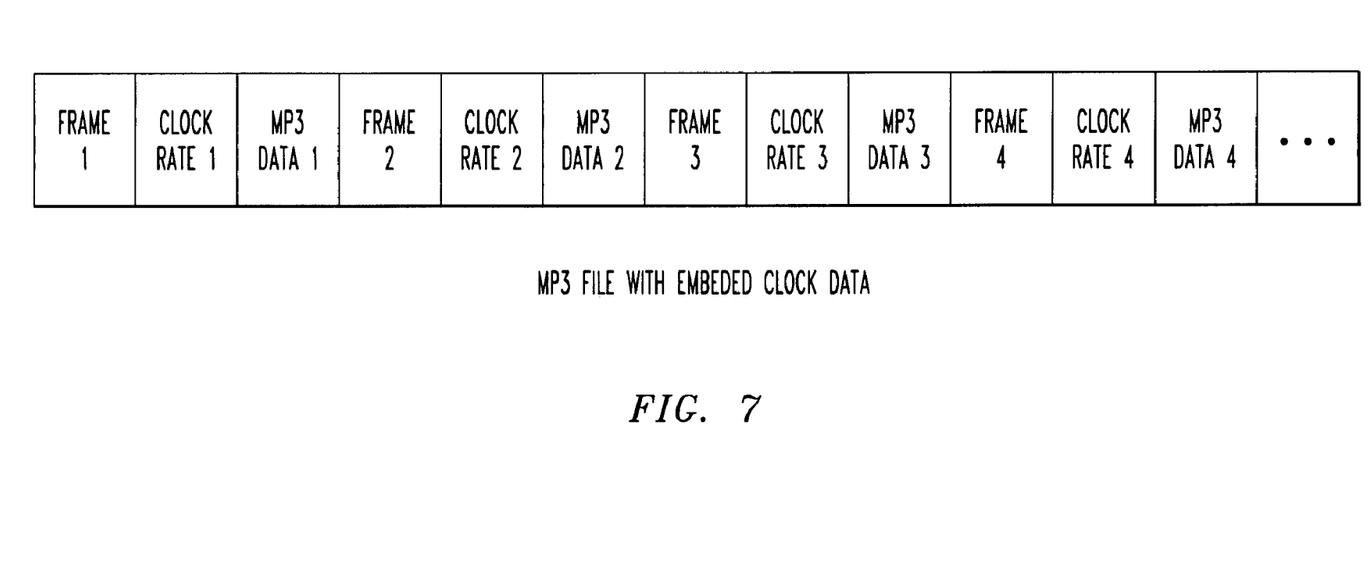
FIG. 7 shows the clock rate requirement needed for the MP3 blocks encoded within the MP3 stream. Using a modified MP3 stream parser, the clock rate needed is removed from the stream and sent to the clock while the MP3 stream is forwarded to the standard MP3 decoder software.

It will be clear to those of ordinary skill in the art that the present invention can also be embedded in any streaming protocol over any kind of connection, such as is shown in FIG. 7.

FIG. 7 shows the clock rate requirement needed for the MP3 blocks encoded within the MP3 stream. Using a modified MP3 stream parser, the clock rate needed is removed from the stream and sent to the clock while the MP3 stream is forwarded to the standard MP3 decoder software.

Accordingly, the present invention matches CPU clock rates to entertainment data that it's controlling, making sure that there are enough processor cycles in the given length of playback time of the relevant file, to complete the task, thus minimizing wasted clock cycles. The more accurate the clock profile, the better the power savings.

The present invention has applicability to any entertainment device that plays pre-recorded entertainment data files or streams having dynamic compute cycle requirements. Examples are MP3 players, DVD players, digital video recorders/players, etc.

While the invention has been described with reference to the exemplary embodiments thereof, those skilled in the art will be able to make various modifications to the described embodiments of the invention without departing from the true spirit and scope of the invention.

What is claimed is:

1. In an entertainment device capable of playing digital data, a power savings module comprising:
   a variable speed clock;
   a clock speed profile determiner module to adaptively set a speed of said variable speed clock based on a MIPS requirement of immediately upcoming digital data to be played by said entertainment device;
   wherein said MIPS requirement is determined from a previous playing of said diqital data in said entertainment device and stored in said entertainment device.

2. In an entertainment device capable of playing digital data according to claim 1, wherein:
   said entertainment device is battery powered to allow portability.

3. In an entertainment device capable of playing digital data according to claim 1, wherein:
   said digital data file is an MP3 compressed audio file.

4. In an entertainment device capable of playing digital data according to claim 1, wherein:
   said digital data is a digital video disk (DVD).

5. In an entertainment device capable of playing digital data according to claim 1, wherein:
   said variable speed clock is a voltage controlled oscillator (VCO).

6. In an entertainment device capable of playing digital data according to claim 1, further comprising:
   a profile file defining a MIPS requirement of said digital data.

7. In an entertainment device capable of playing digital data according to claim 6, wherein:
   said digital data is an MP3 compressed digital audio file.

8. In an entertainment device capable of playing digital data according to claim 6, wherein:
   said digital data is a compressed digital data file.

9. A method for saving power usage in an entertainment device, comprising:
   determining from a previous playing of digital data in said entertainment device an approximate minimum required MIPS for playback of immediately upcoming digital data to be played by said entertainment device;
   storing said approximate minimum required MIPS in said entertainment device; and
   adjusting a speed of a processor clock in said entertainment device based on said determined approximate minimum required MIPS for playback of said immediately upcoming digital data to be played by said entertainment device.

10. The method for saving power usage in an entertainment device according to claim 9, further comprising:
    adding a predetermined margin amount of MIPS to said approximate minimum required MIPS.

11. The method for saving power usage in an entertainment device according to claim 9, wherein:
    said margin amount of MIPS are a fixed percentage increase over said approximate minimum required MIPS.

12. The method for saving power usage in an entertainment device according to claim 9, further comprising:
    re-adjusting said speed of said processor clock in said entertainment device after playback of said digital data based on required MIPS for playback of other immediately upcoming digital data to be played by said entertainment device.

13. Apparatus for saving power usage in an entertainment device, comprising:
    means for determining from a previous playing of digital data in said entertainment device an approximate minimum required MIPS for playback of immediately upcoming digital data to be played by said entertainment device;
    means for storing said approximate minimum required MIPS in said entertainment device; and
    means for adjusting a speed of a processor clock in said entertainment device based on said determined approximate minimum required MIPS for playback of said immediately upcoming digital data to be played by said entertainment device.

14. The apparatus for saving power usage in an entertainment device according to claim 13, further comprising:
    means for adding a predetermined margin amount of MIPS to said approximate minimum required MIPS.

15. The apparatus for saving power usage in an entertainment device according to claim 13, wherein:
    said margin amount of MIPS are a fixed percentage increase over said approximate minimum required MIPS.

16. The apparatus for saving power usage in an entertainment device according to claim 13, further comprising:
    re-adjusting said speed of said processor clock in said entertainment device after playback of said digital data based on required MIPS for playback of other immediately upcoming digital data to be played by said entertainment device.

* * * * *